United States Patent [19]
Johnson, Jr. et al.

[11] Patent Number: 4,534,702
[45] Date of Patent: Aug. 13, 1985

[54] PNEUMATIC CONTROL VALVE ACTUATOR COMPUTER CONTROL ARRANGEMENT

[75] Inventors: Raymond G. Johnson, Jr., Orange, Conn.; Bill L. Trustee, Jamaica, N.Y.; William C. Fischer, Monroe, Conn.

[73] Assignee: United Technologies Corporation, Hartford, Conn.

[21] Appl. No.: 565,668

[22] Filed: Dec. 27, 1983

[51] Int. Cl.$^3$ .................... F01D 17/00; B64C 11/18; B64C 27/06; B64C 19/00

[52] U.S. Cl. .................... 416/20 R; 416/31; 416/90 A; 244/17.13

[58] Field of Search .................... 416/20 R, 31, 90 A; 244/17.13; 137/601

[56] References Cited

U.S. PATENT DOCUMENTS 3,904,313 9/1975 Bernaerts .................... 416/90 A X
4,132,500 1/1979 Reader et al. .................... 416/90 A X
4,242,044 12/1980 McCoubrey .................... 416/90 A X Primary Examiner—Robert E. Garrett
Assistant Examiner—George Kapsalas
Attorney, Agent, or Firm—Gerald E. Linden

[57] ABSTRACT

Quad-redundant signal processors in a flight control computer control valves to modulate airflow in a circulation control rotor system. The valves are arranged in a series and each valve is responsive to two signal processors. Loss of a valve occurs when both signal processors for that valve fail. A first valve, and every fourth valve in the series thereafter is responsive to a first signal processor and a third signal processor. The next valve in the series, and every fourth valve in the series thereafter is responsive to a second signal processor and a fourth signal processor. The third valve in the series, and every fourth valve in the series thereafter is responsive to the first signal processor and the fourth signal processor. The next valve in the series, and every fourth valve in the series thereafter is responsive to the second signal processor and the third signal processor. Predetermined pairs of adjacent valves define fixed rotor locations and the pair of valves at a fixed rotor location are controlled each by two and aggregately by all four signal processors. The first and second processors are in a separate chassis from the third and fourth processors.

3 Claims, 4 Drawing Figures

| | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|---|---|---|---|---|---|---|---|
| AC | X | | | | X | | | | X | | | | X | | | | X | | | | X | | | |
| BD | | X | | | | X | | | | X | | | | X | | | | X | | | | X | | |
| AD | | | X | | | | X | | | | X | | | | X | | | | X | | | | X | |
| BC | | | | X | | | | X | | | | X | | | | X | | | | X | | | | X |

4,534,702

PNEUMATIC CONTROL VALVE ACTUATOR COMPUTER CONTROL ARRANGEMENT

DESCRIPTION

1. Technical Field

The invention relates to a control system for the pneumatic valves of a circulation control rotor system and, more particularly, to redundancy and separation rules for a quad-redundant computer.

2. Background Art

An X-wing aircraft employs a rigid rotor utilizing circulation control airfoils. The rotor is driven mechanically, and both collective and cyclic pitch control are achieved by blowing compressed air through leading edge and trailing edge slots on the rotor blades. In a locked position the rotor functions as a wing.

The pneumatic system for the X-wing aircraft includes an air compressor and valving for controlling the flow of air to the leading and trailing edge slots of the blades as a function of the blade azimuthal position. One way of controlling the distribution of air to the blades according to their azimuthal position is to provide an annular series of equally spaced valves around a circumference of a plenum chamber that receives compressed air from the air compressor. As the blades rotate around the plenum, blade ducts are presented to the valves serially. The amount of air received by a blade at each valve location is regulated by that valve's percent-open. In the locked position, predetermined valves communicate with the blades.

The valve openings are regulated by a control system working through actuators. The blade ducts preferably span the width of two valves so that a short averaging effect is produced which smooths valve to valve transitions and tends to reduce transient disturbances which might result from an inoperative or disabled valve. Furthermore, separate banks of independently controlled trailing edge valves and leading edge valves are provided in the plenum. It is easily seen that a failure of either the valves, the actuators or the control system would decrease control over the aircraft. It is a failure of the latter that forms the subject matter of this invention.

DISCLOSURE OF INVENTION

Therefore it is an object of this invention to provide for a high degree of fault-tolerance in the flight control system computer that operates the circulation control valves in an X-wing aircraft.

According to the invention, an annular series of valves is associated with an air plenum for modulating the amount of air that is ejected from the leading and trailing edge slots in a circulation control rotor. A computer has four redundant signal processors (A,B,C,D) that control the valves, two processors operating each valve. Two of the processors are in a first chassis (group) and the other two processors are in a second group. The valves are connected to the processors in the following manner: a first valve, and every fourth valve in the series thereafter, is connected to a signal processor (A) in the first group and a signal processor (C) in the second group; the next valve in the series, and every fourth valve thereafter, is connected to the other signal processor (B) in the first group and the other signal processor (D) in the second group; the next valve in the series, and every fourth valve thereafter, is connected to the signal processor (A) in the first group and the other signal processor (D) in the second group; and the next valve in the series, and every fourth valve thereafter, is connected to the other signal processor (B) in the first group and the signal processor (C) in the second group.

According further to the invention, in the locked (nonrotating) position, four pairs of adjacent valves communicate with the blades; one pair per blade, and the pairs are evenly distributed in the series.

The foregoing and other objects, features and advantages of this invention are described in further detail in the following detailed description of an embodiment thereof.

BEST MODE FOR CARRYING OUT THE INVENTION

Figure 1:
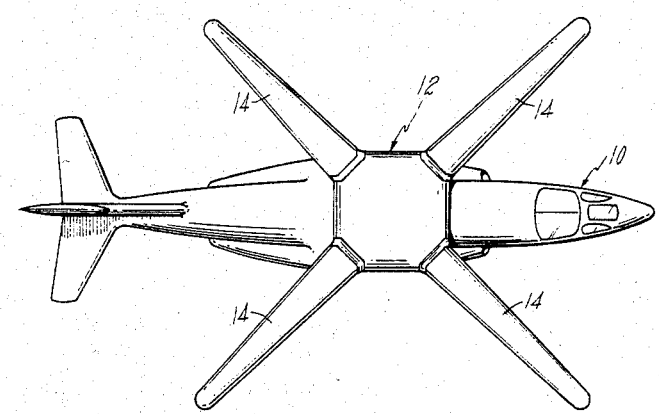
FIG. 1 is a view of an X-wing aircraft showing major components.

The aircraft of FIG. 1 includes a fuselage 10 on top of which is mounted a rotor system 12 including four blades 14 and a hub 16. The blades 14 are circulation controlled airfoils, each having leading edge and trailing edge slots through which compressed air from a pneumatic system is ejected. Control is obtained by cyclically and collectively modulating the amount of ejected airflow. In certain flight regimes, such as landing and taking off, the rotor system rotates; and in other flight regimes, such as forward flight, the rotor system is stationary and is locked in the position shown.

Figure 2:
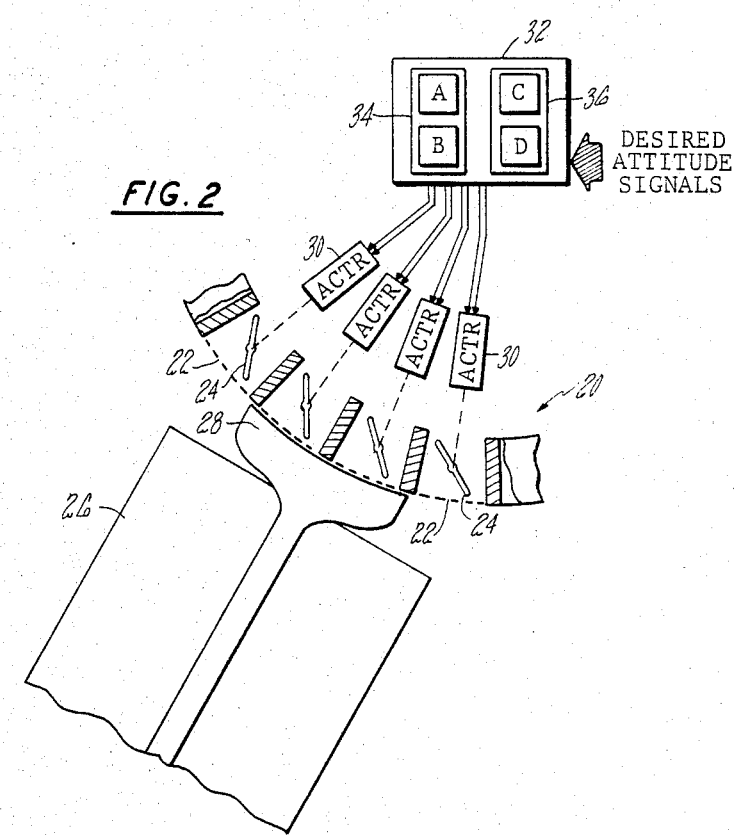
FIG. 2 is a stylized partial view of air distribution and modulation apparatus for the X-wing aircraft.

In FIG. 2 there is shown a section of an annular plenum chamber 20 about the outer circumference of which is disposed a circular series (bank) of openings 22 and associated valves 24. The plenum 20 receives compressed air from an air compressor (not shown) and the valves 24 modulate the amount of air that flows through the openings 22. For this example, twenty-four valves are distributed evenly (every fifteen degrees) around the circumference of the plenum 20. A rotor blade 26 has a receiver duct 28 disposed at its root end and in airflow communication with the openings 22. As the blade 26 rotates, the receiver duct 28 is in airflow communication with the entire bank of openings 22 sequentially around the circumference of the plenum 20. The receiver duct 28 spans the width of two openings 22 and provides modulated airflow to either a leading edge or a trailing edge slot in the blade 26. Since both a leading and a trailing edge slot are provided in each blade 26, a separate receiver duct (not shown) is in airflow communication with a separate bank of valves and openings (not shown) in the plenum chamber 20 to provide modulated airflow to the other edge of the blade. When the rotor system is locked in a forward flight regime the receiver duct 28 for each blade is in airflow communication with two particular openings 22 at what is referred to herein as fixed rotor locations, one for each of the four blades 14.

Each valve is actuated by a dual channel actuator 30 that is responsive to signals from a computer 32. The computer 32 is a quad-redundant computer having four separate signal processors (A–D) arranged in two chassis 34, 36 (groups) of two processors each. As is indicated by the two lines going to each actuator, each actuator (and hence, each valve) is responsive to the signals from two processors, one per actuator channel, either of which is capable of providing full-authority control over the actuator in the event of the failure of the other, but under non-failure conditions each processor contributes half authority. The failure of two processors is therefore required to "lose" a valve. In other words, when both channels of the actuator shut down, the valve becomes passive, no longer controlled by the computer. This is disclosed in greater detail in commonly owned U.S. application Ser. No. 566,004. The computer 32 is responsive to control signals indicative of a desired flight response which may be provided either by a manual control system or by an automatic flight control system (AFCS) or both. The output signals of the computer 32 affect the control of the aircraft by modulating the airflow in the circulation control rotor.

Figures 3, 4:
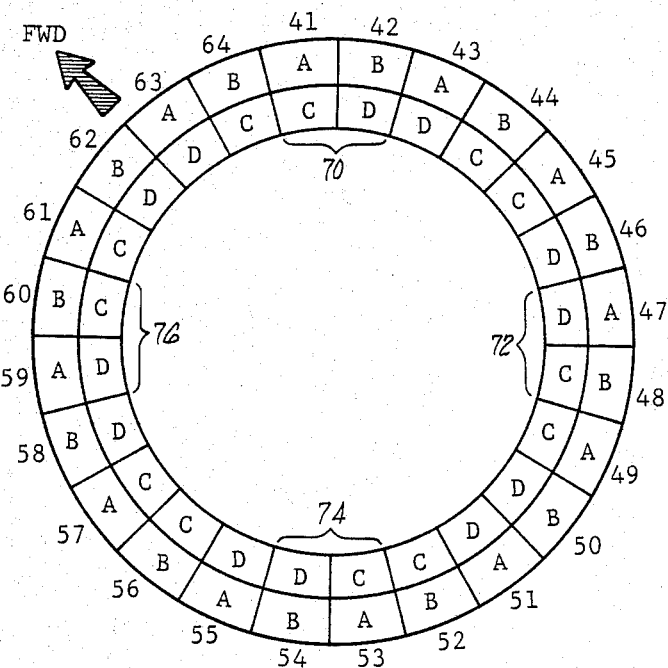
FIG. 3 is a chart showing the distribution of four signal processors to individual valves, two at a time, of this invention.
FIG. 4 is another chart showing the distribution of signal processors of this invention.

The purpose for quad-redundancy in the computer 32 is to provide maximum fault tolerance in the event of individual processor failures. Therefore, there are redundancy and separation rules that apply to the distribution of the signal processors, two at a time, to the actuators 30. There is shown in FIG. 3 a representation of twenty-four valves, numbered 41 through 64 distributed about the circumference of the plenum chamber (20). These valves 41–64 correspond to the valves 24 of FIG. 2. The letters A,B,C, and D refer to four individual signal processors within the quad-redundant computer 32. By definition, the signal processors A and B are in one group and the signal processors C and D are in the other group. Each valve is responsive to two signal processors. The four fixed rotor locations 70, 72, 74, 76 are evenly distributed around the circumference of the plenum chamber 20 at 45 degrees to the direction of forward flight (FWD) and, controlwise, occur at regular intervals within the valve series. A pair of adjacent valves define each fixed rotor location.

Turning now to the separation and redundancy rules:

Rule 1. No valve (i.e., actuator) shall be responsive to (controlled by) the two signal processors of one group. In other words, the combinations AB and CD are not permitted.

Rule 2. The two valves at each of the fixed rotor locations shall be controlled by all four signal processors.

Rule 3. The valves on either side of and immediately adjacent to the fixed rotor locations shall be controlled by all four signal processors.

Rule 4. No two signal processor failures shall result in the loss of two adjacent valves or two of three adjacent valves.

Rule 5. Any combination of two signal processor failures results in the loss of an equal number of equally spaced valves.

The above criteria are met by distributing the signals from the signal processors to the valves in the following manner.

Each valve is controlled by one of four signal processor combinations; either AC, BD, AD, or BC. The combinations AB and CD are prohibited by Rule 1. As a starting point, the combination AC is assigned to the valve 41. Also, the adjacent valves 41 and 42 are selected as a fixed rotor location 70. Therefore, in compliance with Rule 2, the responsiveness of the valve 41 to the combination AC mandates the responsiveness of the valve 42 to the combination BD.

According to Rule 3, the valves 43 and 64 must be responsive to all four signal processors. Of the four available combinations of signal processors for the valve 43, two are prohibited by Rule 4; the combination BD is prohibited because a failure of the processors B and D would result in the loss of two adjacent valves 42 and 43, and the combination AC is prohibited because a failure of the processors A and C would result in the loss of two of three adjacent valves, 41 and 43. This leaves two choices for the valve 43, either AD or BC. Either choice is acceptable, and the combination AD is chosen for this example. Therefore, since the valve 43 is responsive to the combination AD, the valve 64 must be responsive to the combination BC.

A pattern emerges which satisfies all of the rules. Beginning with the first valve 41 every other valve is responsive to the signal processor A. Similarly, every other valve beginning with the valve 42 is responsive to the signal processor B. Each occurrence of a valve that is controlled by the processor A entails two possibilities; either that valve is also controlled by the processor C, or it is also controlled by the processor D (Rule 1). As is evident from FIG. 3, for each occurrence of a valve that is controlled by the processor A, and one of the processors from the group comprising C and D the next valve in the series that is controlled by the processor A must be controlled by the other processor of the group comprising C and D to comply with the specification of Rule 4 that no two processor failures will result in the loss of two out of three adjacent valves. A similar statement may be made for each occurrence of a valve that is controlled by the processor B. This establishes a redundancy and separation pattern that satisfies all of the rules and also minimizes the valve losses due to two processor failures.

Although only four valves 64, 41, 42 and 43 have been described in detail, the pattern established by these four valves repeats itself in the series. Therefore, another way of describing the pattern is that the first valve (e.g. 41), and every fourth valve thereafter in the series (sequence), is connected to a signal processor (A) from the first group (A and B) and to a signal processor (C) from the second group (C and D). The next valve in the series (e.g. 42), and every fourth valve thereafter, is connected to the other signal processor (B) from the first group and to the other signal processor (D) from the second group. The next valve in the series (e.g. 43) and every fourth valve thereafter, is connected to the signal processor (A) from the first group and to the other signal processor (D) from the other group. The next valve, and every fourth valve in the series thereafter (e.g. 44, 64) is connected to the other signal processor (B) in the first group and the signal processor (C) in the second group. This pattern satisfies all of the rules.

FIG. 4 also shows which signal processors are connected to which valves. The four permissible signal processor combinations are listed along the left side of the chart (AC, BD, AD, BC) and the valves 41–64 are listed in their sequential order across the top of the chart. As stated hereinbefore, the failure of two processors in one group, in other words, A and B or C and D will not cause the loss of a valve. However, the failure of any two processors, one from each group, will result in the loss of an equal number of equally spaced valves. (Rule 5) For instance, a failure of the processor A and C will result in the loss of the valves 41, 45, 49, 53, 57 and 61; six valves equally distributed in the series about the circumference of the plenum chamber. As can be seen from the chart, the failure of any two processors within the range of permissible combinations will result in the loss of every fourth valve. This provides a high degree of fault tolerance in the control of the valves, especially in the light of the teaching of the commonly owned U.S. Pat. No. 4,507,050 which teaches the use of averaging springs between adjacent valves to compensate for the loss of operation of an actuator.

While it is evident that the pattern is well suited to multiples of four valves arranged in a repeating circular bank, it should be understood that the number of valves is not limited to twenty-four and a linear bank of any number of valves could benefit from the control scheme.

The foregoing description of this invention is intended to enable those skilled in the art to practice the invention. Various other embodiments and modifications as are suited to the particular use contemplated will become apparent upon examination and practice of the invention.

What is claimed is:

1. A control system for a circulation control rotor system in an aircraft comprising:

a compressed air supply;

a plenum connected to receive compressed air from the compressed air supply;

a plurality of valves distributed in a series around a circumference of the plenum for modulating the escape of air through openings in the plenum in response to signals for controlling the aircraft, wherein one of the valves in the series is designated as the first plenum valve and the valve which is next to the first plenum valve in the series is designated as the second plenum valve and the valve which is next to the second plenum valve in the series is designated as the third valve and the valve which is next to the third plenum valve in the series is designated as the fourth plenum valve;

means for providing signals indicative of a desired control response; and a quad-redundant flight control computer for providing the signals for controlling the airflow to the valves in response to the signals indicative of a desired control response, including a first signal processor; a second signal processor; a third signal processor; and a fourth signal processor; characterized in that:

the first plenum valve and every incremental fourth valve in the series thereafter is responsive to the first signal processor and the third signal processor;

the second plenum valve and every incremental fourth valve in the series thereafter is responsive to the second signal processor and the fourth signal processor;

the third plenum valve and every incremental fourth valve in the series thereafter is responsive to the first signal processor and the fourth signal processor; and the fourth plenum valve and every incremental fourth valve in the series thereafter is responsive to the second signal processor and the third signal processor.

2. A control system according to claim 1 characterized in that predetermined pairs of adjacent valves define fixed rotor locations and the pair of adjacent valves define fixed rotor locations are controlled in aggregate by the first signal processor, the second signal processor, the third signal processor and the fourth signal processor.

3. A control system according to claim 1 characterized in that the computer has two chassis, and the first and second signal processors are in one chassis and the third and fourth signal processors are in the other chassis.

* * * * *

UNITED STATES PATENT AND TRADEMARK OFFICE
CERTIFICATE OF CORRECTION

PATENT NO. : 4,534,702
DATED : August 13, 1985
INVENTOR(S) : Raymond G. Johnson, Jr. et al It is certified that error appears in the above-identified patent and that said Letters Patent is hereby corrected as shown below:

Column 1, after "DESCRIPTION" insert paragraph --The Government has rights in this patent under Contract No. NAS2-11058 awarded by NASA--.

Claim 2, Column 6, line 29: after "pair of" delete "adjacent".

Claim 2, Column 6, line 30: delete "define fixed rotor locations" and insert --at each fixed rotor location--.

Signed and Sealed this

Sixteenth Day of June, 1992

*Attest:*

DOUGLAS B. COMER

*Attesting Officer*  *Acting Commissioner of Patents and Trademarks*